(12) United States Patent
Lim

(10) Patent No.: US 10,691,795 B2
(45) Date of Patent: Jun. 23, 2020

(54) QUANTITATIVE UNIFIED ANALYTIC NEURAL NETWORKS

(71) Applicant: Certis Cisco Security Pte Ltd, Singapore (SG)

(72) Inventor: Keng Leng Albert Lim, Singapore (SG)

(73) Assignee: Certis Cisco Security Pte Ltd, Singapore (SG)

( * ) Notice: Subject to any disclaimer, the term of this patent is extended or adjusted under 35 U.S.C. 154(b) by 204 days.

(21) Appl. No.: 15/741,172

(22) PCT Filed: Oct. 24, 2016

(86) PCT No.: PCT/SG2016/050515
§ 371 (c)(1),
(2) Date: Dec. 29, 2017

(87) PCT Pub. No.: WO2018/080392
PCT Pub. Date: May 3, 2018

(65) Prior Publication Data
US 2019/0095618 A1    Mar. 28, 2019

(51) Int. Cl.
*G06F 21/55* (2013.01)
*G06F 21/56* (2013.01)
(Continued)

(52) U.S. Cl.
CPC ............ *G06F 21/554* (2013.01); *G06F 17/18* (2013.01); *G06F 21/316* (2013.01); *G06F 21/55* (2013.01); *G06F 21/56* (2013.01); *G06K 9/6223* (2013.01); *G06K 9/6256* (2013.01); *G06K 9/6267* (2013.01); *G06N 3/0454* (2013.01); *G06N 3/0481* (2013.01); *G06N 3/088* (2013.01); *G06N 7/00* (2013.01); *G06N 20/00* (2019.01); *H04L 63/1408* (2013.01)

(58) Field of Classification Search
CPC ....... G06F 21/554; G06F 17/18; G06N 20/00; G06N 3/0481; G06N 3/088; G06N 7/00; G06K 9/6223; G06K 9/6256; G06K 9/6267
USPC ........................................... 726/22
See application file for complete search history.

(56) References Cited

U.S. PATENT DOCUMENTS 8,978,136 B2 * 3/2015 Day ...................... G06F 21/552
                                                        726/13
9,319,420 B1 * 4/2016 Franke ................ H04L 63/1416
(Continued)

FOREIGN PATENT DOCUMENTS

WO    WO 2016/138067         9/2016

OTHER PUBLICATIONS

International Search Report from Australian Patent Office dated Jan. 27, 2017 for relating International Application No. PCT/SG2016/050515.
(Continued)

*Primary Examiner* — Shahriar Zarrineh
(74) *Attorney, Agent, or Firm* — BakerHostetler

(57) ABSTRACT

This document describes a system and method for quantitatively unifying and assimilating all unstructured, unlabelled and/or fragmented real-time and non-real-time cyber threat data generated by a plurality of sources. These sources may include cyber-security surveillance systems that are equipped with machine learning capabilities.

16 Claims, 8 Drawing Sheets

(51) Int. Cl.
  H04L 29/06    (2006.01)
  G06F 21/31    (2013.01)
  G06N 3/04     (2006.01)
  G06N 20/00    (2019.01)
  G06F 17/18    (2006.01)
  G06K 9/62     (2006.01)
  G06N 3/08     (2006.01)
  G06N 7/00     (2006.01)

(56) References Cited

U.S. PATENT DOCUMENTS

| | | | |
|---|---|---|---|
| 9,641,544 B1* | 5/2017 | Treat | H04L 63/1425 |
| 9,716,617 B1* | 7/2017 | Ahuja | H04L 67/1031 |
| 9,824,216 B1* | 11/2017 | Khalid | G06F 21/566 |
| 10,230,749 B1* | 3/2019 | Rostami-Hesarsorkh | H04L 63/1425 |
| 10,262,133 B1* | 4/2019 | Cohen | H04L 63/14 |
| 2004/0044912 A1* | 3/2004 | Connary | H04L 43/045 |
| | | | 726/23 |
| 2007/0039049 A1* | 2/2007 | Kupferman | G06F 11/3495 |
| | | | 726/22 |
| 2007/0094491 A1* | 4/2007 | Teo | H04L 63/1408 |
| | | | 713/153 |
| 2007/0289013 A1 | 12/2007 | Lim | |
| 2010/0205128 A1* | 8/2010 | Nolan | G06F 16/9535 |
| | | | 706/13 |
| 2012/0174219 A1* | 7/2012 | Hernandez | G06F 21/562 |
| | | | 726/22 |
| 2012/0233698 A1* | 9/2012 | Watters | G06F 21/554 |
| | | | 726/25 |
| 2012/0253891 A1* | 10/2012 | Hayes | G06Q 10/06 |
| | | | 705/7.39 |
| 2013/0074143 A1* | 3/2013 | Bu | H04L 63/1416 |
| | | | 726/1 |
| 2013/0247130 A1* | 9/2013 | Gupta | G06F 21/57 |
| | | | 726/1 |
| 2013/0298230 A1* | 11/2013 | Kumar | G06F 21/52 |
| | | | 726/22 |
| 2014/0007238 A1 | 1/2014 | Magee et al. | |
| 2014/0143863 A1* | 5/2014 | Deb | G06F 21/552 |
| | | | 726/22 |
| 2014/0201836 A1 | 7/2014 | Amsler | |
| 2014/0283048 A1* | 9/2014 | Howes | G06F 17/2785 |
| | | | 726/23 |
| 2014/0327573 A1* | 11/2014 | Leibner | H04K 3/22 |
| | | | 342/357.59 |
| 2014/0344926 A1* | 11/2014 | Cunningham | H04L 63/1441 |
| | | | 726/22 |
| 2015/0058982 A1 | 2/2015 | Eskin et al. | |
| 2015/0128274 A1* | 5/2015 | Giokas | H04L 63/1416 |
| | | | 726/23 |
| 2015/0163242 A1 | 6/2015 | Laidlaw et al. | |
| 2015/0172321 A1* | 6/2015 | Kirti | H04L 63/1416 |
| | | | 726/1 |
| 2015/0207809 A1* | 7/2015 | MacAulay | G06F 21/552 |
| | | | 726/22 |
| 2015/0215334 A1* | 7/2015 | Bingham | G06N 20/00 |
| | | | 726/23 |
| 2015/0319185 A1 | 11/2015 | Kirti et al. | |
| 2015/0373043 A1* | 12/2015 | Wang | G06F 21/552 |
| | | | 706/12 |
| 2016/0006756 A1* | 1/2016 | Ismael | H04L 63/1441 |
| | | | 726/22 |
| 2016/0065599 A1* | 3/2016 | Hovor | H04L 67/20 |
| | | | 726/23 |
| 2016/0080408 A1* | 3/2016 | Coleman | H04L 63/1433 |
| | | | 726/22 |
| 2016/0149943 A1* | 5/2016 | Kaloroumakis | G06N 7/005 |
| | | | 726/23 |
| 2016/0156655 A1 | 6/2016 | Lotem et al. | |
| 2016/0182544 A1* | 6/2016 | Adjaoute | H04L 63/1416 |
| | | | 705/7.15 |
| 2016/0197941 A1* | 7/2016 | Smith | H04L 63/1408 |
| | | | 726/22 |
| 2016/0248805 A1* | 8/2016 | Burns | H04L 63/1408 |
| 2016/0330219 A1* | 11/2016 | Hasan | H04L 63/1408 |
| 2017/0171235 A1* | 6/2017 | Mulchandani | H04L 63/1425 |
| 2017/0208085 A1* | 7/2017 | Steelman | H04L 63/1433 |
| 2017/0228658 A1* | 8/2017 | Lim | H04L 63/1425 |
| 2017/0243008 A1* | 8/2017 | Cornell | G06F 21/554 |
| 2017/0251003 A1* | 8/2017 | Rostami-Hesarsorkh | H04L 63/1425 |
| 2017/0279836 A1* | 9/2017 | Vasseur | H04L 63/1425 |
| 2017/0316204 A1* | 11/2017 | Thakur | G06F 21/554 |
| 2018/0004942 A1* | 1/2018 | Martin | G06F 21/554 |
| 2018/0027006 A1* | 1/2018 | Zimmermann | H04L 63/0245 |
| | | | 726/11 |
| 2018/0255084 A1* | 9/2018 | Kotinas | G06K 9/6222 |
| 2019/0095618 A1* | 3/2019 | Lim | G06N 3/088 |
| 2019/0132344 A1* | 5/2019 | Lem | G06F 21/552 |
| 2019/0294784 A1* | 9/2019 | Martin | G06F 21/552 |

OTHER PUBLICATIONS

Written Opinion from Australian Patent Office dated Jan. 27, 2017 for relating International Application No. PCT/SG2016/050515.
International Preliminary Report on Patentability from Australian Patent Office dated Sep. 18, 2017 for relating International Application No. PCT/SG2016/050515.

* cited by examiner

QUANTITATIVE UNIFIED ANALYTIC NEURAL NETWORKS

CROSS REFERENCED APPLICATIONS

The present application is a PCT national phase filing of PCT Application Number PCT/SG2016/050515 filed on Oct. 24, 2016 that is hereby incorporated by reference as if set forth herewith.

FIELD OF THE INVENTION

This invention relates to a system and method for quantitatively unifying and assimilating all unstructured, unlabelled and/or fragmented real-time and non-real-time cyber threat data generated by a plurality of sources. These sources may include cyber-security surveillance systems that are equipped with machine learning capabilities.

The invention then encompasses all the disparate data generated by these systems by integrating the disjointed and inchoate collected data into a massive analytical neural network ensemble. The neural network ensemble then processes the integrated data using a combination of unsupervised and supervised machine learning techniques to generate reinforced learning assertion functions which are then utilized to empower the neural network and affiliated cyber-security surveillance systems sources with the capabilities to analyse cyber threat data at a faster rate and more accurately.

SUMMARY OF PRIOR ART

It is a norm of late to expect all businesses to be connected to the Internet nowadays. As such, businesses are now able to liaise easily with their counterparts or customers halfway across the world thanks to these advancements in connectivity. The downside to this is that this increased connectivity renders businesses vulnerable to cyber-attacks from a wide variety of malicious sources as they are now connected to a large global community. Data security threats such as cyber-attacks on computer networks have become increasingly sophisticated, making it difficult for network administrators and security personnel to easily detect and respond to these attacks. These cyber-attacks usually are in the form of malwares, Trojans, computer viruses, worms, phishing, email spoofing, or port scans and the objective of these attacks is to create backdoors or openings in the system to gain access to sensitive files/data on the network.

In order to detect and generate counter measures against cyber threats and/or to improve the security posture of computer networks, cyber-security providers and network administrators usually require a priori knowledge about the cyber-threats. This knowledge would include the signature of the particular malware, ports that may be compromised, origins of suspicious Internet Protocol (IP) addresses, related websites and their Universal Resource Locators (URLs) so that network administrators and security providers are able to develop a comprehensive solution to prevent and mitigate these attacks. Without a priori knowledge of these cyber-threats, it becomes almost impossible for security providers and network administrators to form or generate countermeasures to address these cyber-attacks. It has been proposed by those skilled in the art that a priori knowledge of threat characteristics be utilized to generate signature-based malware detection techniques. However, as these signatures would not be available when new or modified malwares are first detected, such signature-based detection techniques would not work as the signature of the new threat would not be contained in the relevant database. Furthermore, malicious users could modify their cyber-threats to easily circumvent such signature-based threat detection techniques by slightly altering their configuration to generate a new signature that is not known to the system.

As most businesses are unable to address these data security threats on their own, these businesses usually engage the services of security information and event management (SIEM) systems or other types of security detection systems to provide real time analysis of security alerts generated by networked hardware, e.g. firewalls, routers, intrusion detection systems, and applications. Most SIEMs allow for real time monitoring, correlation of events and generation of event notifications when a threat is detected. Further, SIEMs and other security event identifying systems typically provide storage logs to record historical information about security events that occurred within the monitored system. Although SIEMs and other security identifying systems may generate and record security alerts for devices within the network, SIEMs and other such systems still require the additional step of reviewing the alerts and translating each of these alerts into specific actions or countermeasures. Further, every SIEM vendor would generate data logs or records of security events in their own proprietary format. For example, vendor A may generate data logs using its own format A while vendor B may generate data logs using its own format B. Data generated by these two vendors may not then be easily shared between themselves as they would not be able to decipher, decode and analyse the data generated by their fellow counterparts. Furthermore, the data generated by one vendor would not be compatible with the system of the other vendor.

In addition to SIEM systems, other systems are also utilized to detect and record all sorts of possible information security threats. Such a system is a user behaviour analytics (UBA) system which captures a system user's activity on a monitored system and determines the user's baseline of normal activities that is specific to the monitored system's individual users. The UBA system then proceeds to identify deviations from the norm in near-real-time using big data and machine learning algorithms. To do so, various types of information about the users of the monitored system are collected, such as the access level granted to each user, the job functions of the users and the permissions that are granted to them. All the required information about these users may be collected from historical actions of the users together with the present actions of the users. The UBA system then analyses all this data by comparing the collected data with existing known anomalous behaviour. The records are all also automatically updated when changes are made to the data, such as removal of access or increases in a user's security access level. Behaviour that is determined as anomalous is then stored in a database for further analysis by security personnel.

It would be meaningless if information obtained from UBA systems were to be shared with SIEM systems as the data obtained about the users of a system may not be used to enhance the security posture of a system being monitored by a SIEM system. Conversely, if the data logs of the SIEM system were to be shared with the UBA system, this information also may not be utilized to improve the security posture of a system being by monitored by the UBA system. As such, a glut of big data of known security threats exists. However, there is not a single platform known in the art that is able to correlate the data generated by all of these multiple vendors, systems and/or sources.

For the above reasons, those skilled in the art are constantly striving to come up with a system and method that is capable of receiving and quantitatively unifying unstructured and/or unlabelled information security threat data from any source or system whereby the processed information is then provided back to all the upstream systems to actively tune and improve the security postures of these systems in near-real-time.

SUMMARY OF THE INVENTION

The above and other problems are solved and an advance in the art is made by systems and methods provided by embodiments in accordance with the invention.

A first advantage of some embodiments of systems and methods in accordance with the invention is that unstructured, unlabelled and/or fragmented real-time and non-real-time cyber threat data generated by a plurality of sources may be quantitatively unified and assimilated into a massive analytical neural network ensemble. The output from the neural network may then subsequently be used to tune and strengthen security postures of cyber-security surveillance systems.

A second advantage of some embodiments of systems and methods in accordance with the invention is that threat intelligence data of various sizes and formats may be easily consolidated in near-real-time and the consolidated data is then analysed to identify previously unknown data security threats.

A third advantage of some embodiments of systems and methods in accordance with the invention is that large volumes of unknown data may be processed to identify patterns and threats within these large volumes of data whereby the analysis of this data produces reinforced learning assertion functions that are then used to update and fine tune security postures of cyber-security surveillance systems that provided the fragmented surveillance data.

A fourth advantage of some embodiments of system and methods in accordance with the invention is that the invention acts as the mother-of-all security operation centers (SOCs) thereby negating the need for the existence of multiple SOCs for handling security events generated by a select few surveillance systems.

The above advantages are provided by various embodiments of a method in accordance with the invention operating in the following manner.

According to a first aspect of the invention, a method for quantitative unified analysis of unstructured threat intelligence data, the method to be performed by a computer system comprises receiving unstructured threat intelligence data from molecular level sources, wherein the unstructured threat intelligence data comprises security events generated from the molecular level sources; uniting the received unstructured threat intelligence data by translating the received threat intelligence data into a uniformed meta-format and storing the translated data in a database, wherein each translated data includes at least a time component; determining isolated data points from the translated data stored in the database by grouping the translated data into groups, wherein each group represents a unique time period, and applying unsupervised machine learning techniques to each group of the translated data; determining data outliers from the isolated data points; and generating a learned function using the data outliers.

With reference to the first aspect, in a first possible implementation manner of the first aspect, the unstructured threat intelligence data further comprises triggers generated from atomic level sources, wherein the security events generated from the molecular sources are based on the triggers generated from atomic level sources.

With reference to the first aspect or the first possible implementation manner of the first aspect, in a second possible implementation manner of the first aspect, the determining the isolated data points from the translated data stored in the database comprises: grouping the translated data having time components contained within a first time period into a first group; clustering the translated data in the first group using unsupervised machine learning techniques; plotting the clusters and identifying clusters having a total number of data points below a predefined threshold; and categorizing the data in the identified clusters as isolated data points.

With reference to the first aspect or the first possible implementation manner of the first aspect, in a third possible implementation manner of the first aspect, the determining the isolated data points from the translated data stored in the database comprises: grouping the translated data having time components contained within a first time period into a first group and grouping the translated data having time components contained within a second time period into a second group, wherein the second time period comprises a period of time that is longer than the first time period; clustering the translated data in the first and second groups using unsupervised machine learning techniques; plotting the clusters and identifying clusters having a total number of data points below a predefined threshold; and categorizing the data in the identified clusters as isolated data points.

With reference to the second or third possible implementation manners of the first aspect, in a fourth possible implementation manner of the first aspect, the step of determining data outliers from the isolated data points comprises: generating a fixed sized window; identifying and grouping isolated data points that may be concurrently located within the fixed sized window; and for each group of identified isolated data points, if a total number of identified data points in the group exceeds a minimum threshold, classifying identified data points in the group as data outliers.

With reference to the first aspect, in a fifth possible implementation manner of the first aspect, the generating the learned function comprises: generating training sequences using the data outliers; training supervised machine learning algorithms using the generated training sequences, wherein the learned function comprises at least one trained supervised machine learning algorithm.

With reference to the first aspect, in a sixth possible implementation manner of the first aspect, the method further comprises providing the generated learned function to the at least one of the plurality of upstream sources to tune a security posture of the at least one of the plurality of upstream sources.

With reference to the sixth possible implementation manner of the first aspect, in a seventh possible implementation manner of the first aspect, the tuning the security posture comprises: updating a security rule set of the at least one of the plurality of upstream sources using the provided generated learned function wherein the updated security rule set is used to filter threats.

With reference to the first aspect, or the first to the fourth possible implementation manners of the first aspect, in an eighth possible implementation of the first aspect, the unsupervised machine learning techniques comprises mining metadata from the normalised data, identifying relationships in data of the normalised data by identifying semantic distances between the normalised data and/or using statistical data to determine a relationship between the normalised data.

BRIEF DESCRIPTION OF THE DRAWINGS

The above and other problems are solved by features and advantages of a system and method in accordance with the present invention described in the detailed description and shown in the following drawings.

DETAILED DESCRIPTION

Various embodiments of invention relate to a system and method for quantitatively unifying and assimilating all unstructured, unlabelled and/or fragmented real-time and non-real-time cyber threat data generated by a plurality of sources. These sources may include, but are not limited to, cyber-security surveillance systems that are equipped with machine learning capabilities. The some embodiments of the invention then integrates all the disparate data generated by these systems into a massive analytical neural network ensemble thereby empowering the network with the capabilities to analyse cyber threat data faster and more accurately.

The system in accordance with some embodiments of the invention achieves this goal by receiving all types and sizes of unstructured and unlabelled machine learnt cyber threat data that have been generated by various types of smart cyber-security surveillance systems and/or network detectors in a non-sequential and random manner. The received machine learnt and random data are then unified by the system by translating the received unstructured data into a uniformed meta-format such as the Transportable Incident Format (TIF) and accumulating the TIF in a high density data store. Multiple timeframes of TIF data outliers are then analysed for data outliers using unsupervised machine learning techniques. These data outliers are subsequently used in supervised machine learning algorithms to generate reinforced learning assertion functions which are then used as part of a mitigation triage or counter-measures by the respective cyber-security surveillance systems sources to strengthen and enhance their security postures. It is envisioned that the invention may be utilized as the mother-of-all security operation centers (SOCs) whereby disjointed and inchoate collected data may be integrated and subsequently utilized by the invention to elevate security postures of cyber-security surveillance systems.

One skilled in the art will recognize that many functional units in this description have been labelled as modules throughout the specification. The person skilled in the art will also recognize that a module may be implemented as circuits, logic chips or any sort of discrete component. Further, one skilled in the art will also recognize that a module may be implemented in software which may then be executed by a variety of processors. In some embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Figure 1:
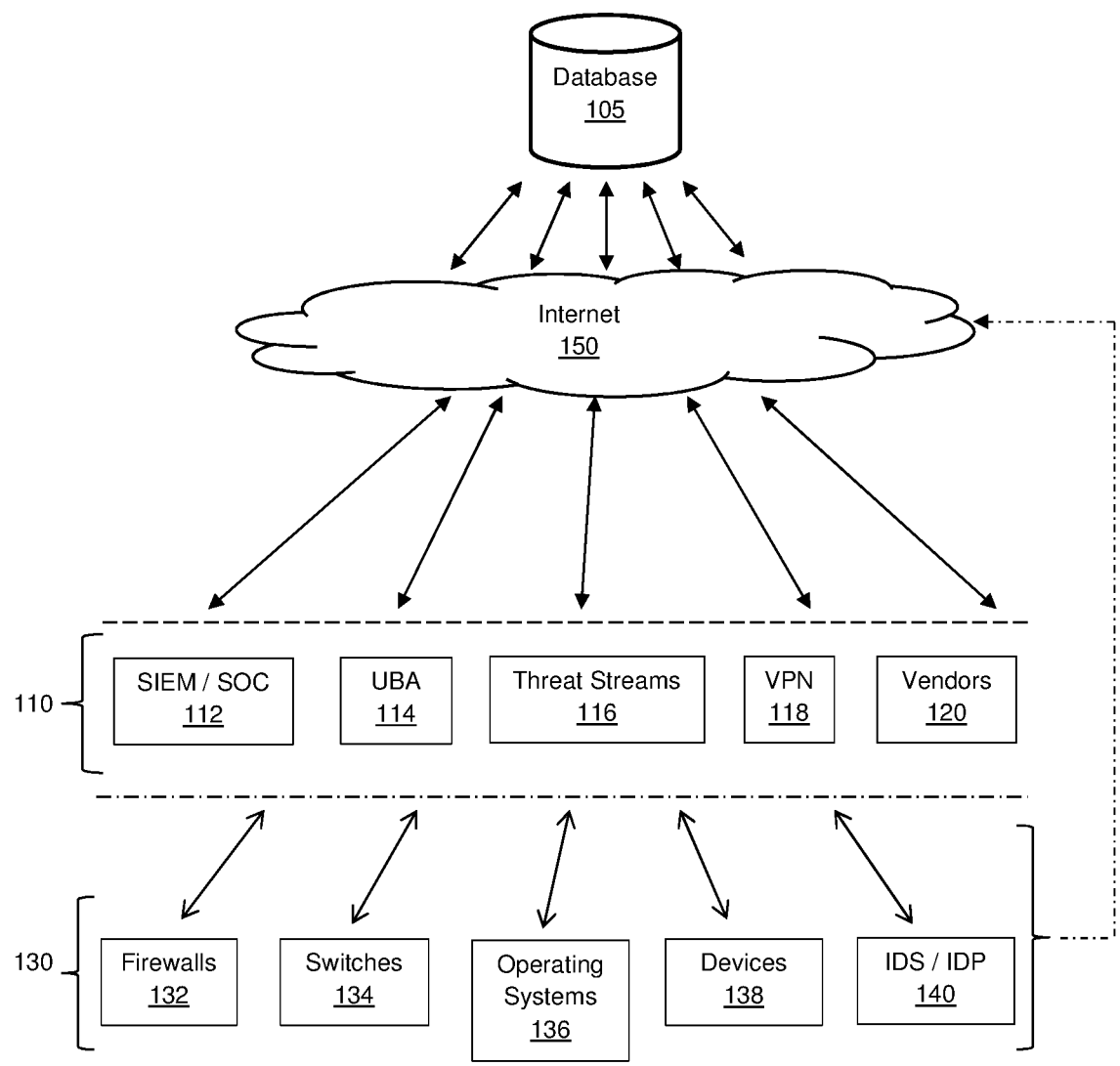
FIG. 1 illustrating a network diagram of a system for receiving and quantitatively unifying threat intelligence data in various formats from a variety of sources in accordance with some embodiments of the invention.

FIG. 1 illustrates a network diagram of a system for receiving and quantitatively unifying threat intelligence data in various formats from a variety of sources in accordance with many embodiments of the invention. In the system illustrated in FIG. 1, a first layer of defence against cyber-threats exists at the atomic level of this system. In this description, any references made to the atomic level refer to intrusion detection systems for monitoring networks or systems for malicious activities or policy violations. This atomic layer acts as the first layer of defence and comprises a plurality of detectors 130. Detectors 130 are deployed within computer networks to protect the computer networks from all sorts of malicious activities. Detectors 130 achieve this by detecting and preventing the network anomalies from occurring, by circumventing the cyber-attacks or countering any known data threats using rule sets which specify certain countermeasures for previously identified threats.

Detectors 130 may include, but are not limited to network devices such as firewalls 132, switches 134, operating systems 136, computing devices 138, intrusion detection systems and intrusion prevention system (IDS/IDP) 140. Although it is not illustrated in FIG. 1, in some implementations, the function performed by detectors 130 may be carried out at a computing system level. Accordingly, functions performed by detectors 130 may be carried out by physical computing systems, such as at end user computing systems, host computing systems, servers, and etc. and may also be further be represented by virtual computing systems, such as virtual machines running within host computers.

In operation, when an anomaly or new security threat is detected by one or more of detectors 130, this causes a trigger to be generated by the affected detector. The generated trigger is then transmitted to any one of cyber-security surveillance systems or identified in this description as centralized data analysis center 110. It should be noted that at any one time, thousands or millions of lines of such triggers may be received by the centralized data analysis centers. These large volumes of disparate date include all types of unstructured, unlabelled and/or fragmented real-time and non-real-time cyber threat data.

The centralized data analysis centers represent a second layer of defence against cyber-threats and these centers addresses the cyber-threats at a molecular level by analysing and processing all the individual triggers generated and transmitted from detectors 130, i.e. triggers sent from the atomic level. In this description, any references made to the molecular level refer to information security management type systems for receiving violations or triggers from detectors 130 whereby these received triggers are analysed and converted into security events if required. Upstream sources or systems such as these centralized data analysis centers 110 include systems such as Security Information and Event Management systems and Security Operation Centre Center (SIEM/SOC) 112, User Behaviour Analytics (UBA) systems 114, threat streams 116, Virtual Private Networks (VPNs) 118, and security analysts and vendors 120. SIEM/SOC system 112, UBA system 114, Threat Streams 116, VPN 118 and vendors 120 may each include communication interfaces, network interfaces, processing systems, computer systems, microprocessors, storage systems, storage media, or some other processing devices or software systems, and the roles performed by these systems may be distributed among multiple devices.

In operation, at least one of these upstream sources (i.e. centralized data analysis centers 110) will receive fragments of data such as security alerts or triggers from any one of detectors 130 or from a plurality of detectors 130. The centralized data analysis centers 110 then perform inspections to determine whether the received alerts or triggers represent actual security issues. If a possible security threat is identified from a received trigger, information about the security threat is then converted into a security event and each centralized data analysis center will then address the security event in its own manner. For example, when SIEM system 112 generates a security event, SIEM system 112 may be configured to inform security personnel at a SOC about the occurrence of the security event if it is the first time the event is occurring. Alternatively, if such security events have occurred before, SIEM system 112 would execute countermeasures that have previously been put in place to address the security event. The security event is then logged into a database within the SIEM system.

Similarly, after UBA system 114 has addressed a security event, the security event detected and addressed by UBA system 114 would be logged and stored within its own database. The step of logging security events takes place in all the centralized data analysis centers and each of these systems will store their data logs in their own formats and sizes. In accordance with a number of embodiments of the invention, after a security event has been generated by any one of the centralized data analysis centers 110, these centers are configured to then transmit their security events to database 105. This means that database 105 would be constantly receiving security events or threat intelligence data in various formats and sizes and the received data may be in real-time or non-real time. Database 105 acts as a massive analytical neural network ensemble that receives and assimilates all the disparate data received from the various cyber-security surveillance systems.

In another embodiment of the invention, after a security event has been generated by any one of the centralized data analysis centers 110, these security events will be used by each of these centralized data analysis centers 110 as the training sets to train supervised learning algorithms to generate learned functions that are then utilized by each individual data analysis center. Each data analysis center will utilize its own issued security events to train its own supervised learning algorithms and typically, a learned function generated by one center may not be utilized by another, i.e. a learned function generated by UBA 114 may not be utilized by SIEM 112 and vice versa. All these generated learned functions are then transmitted to database 105 as well.

In some embodiments of the invention, in addition to receiving security events and/or learned functions from centralized data analysis centers 110, database 105 may also be configured to receive triggers directly from detectors 130 that generated the trigger. In this many of these embodiments, this means that triggers generated by detectors 130 would be transmitted to both centralized data analysis centers 110 and database 105 concurrently.

As database 105 receives the fragmented, unstructured and unlabelled threat intelligence data (e.g. security events of various formats and sizes), triggers and/or learned functions, database 105 translates the received data from its original format and size into a uniformed meta-format. At the very least, the type of incident, the description and time of occurrence fields are extracted from the various types of received data and stored in the uniformed meta-format. In accordance with many embodiments of the invention, the uniformed meta-format may be of a Transportable Incident Format (TIF). All the TIF data files translated from the fragmented, unstructured and unlabelled threat intelligence data would contain attributes that would assist in identifying unique features about the original security event. Attributes contained in the TIF files include the INCIDENT, SOURCE, CATEGORY, DATA and TIME COMPONENT attributes of security events as received from the centralized data analysis centers 110. The above mentioned attributes may also be extracted from the learned functions that are received from the centralized data analysis centers 110.

For example, the "TIME COMPONENT" attribute would contain the date and/or time the security event was detected. The attributes contained in the TIF data files may also include other discrete attributes such as, but are not limited to, PROTOCOL, DESTINATION PORT, DESCRIPTION, etc. One skilled in the art will recognize that in addition to the SOURCE, CATEGORY and DATA attributes, any other combinations of the other attributes may be included in the TIF data without departing from the invention.

Returning to the general operation of database 105, database 105 will continually amass a large database of TIF data files, building up a high density data store, as database 105 continuously receives learned functions and/or security events of various sizes and formats from all the systems contained within the molecular level, i.e. from the centralized data analysis centers 110.

For completeness, it should be noted that data such as triggers and security events may be transmitted from detectors 130 to analysis centers 110 to database 105 either wirelessly or through wired connections. If the data is transmitted wirelessly, this may be done through Internet 150 or wireless networks such as, but are not limited to, cellular networks, satellite networks, telecommunication networks, or Wide Area Networks (WAN). In addition to the above, data may also be transmitted between through wireless communication means such as, but not limited to, Wireless-Fidelity (Wi-Fi), Bluetooth, or Near Field Communication (NFC).

Figure 2:
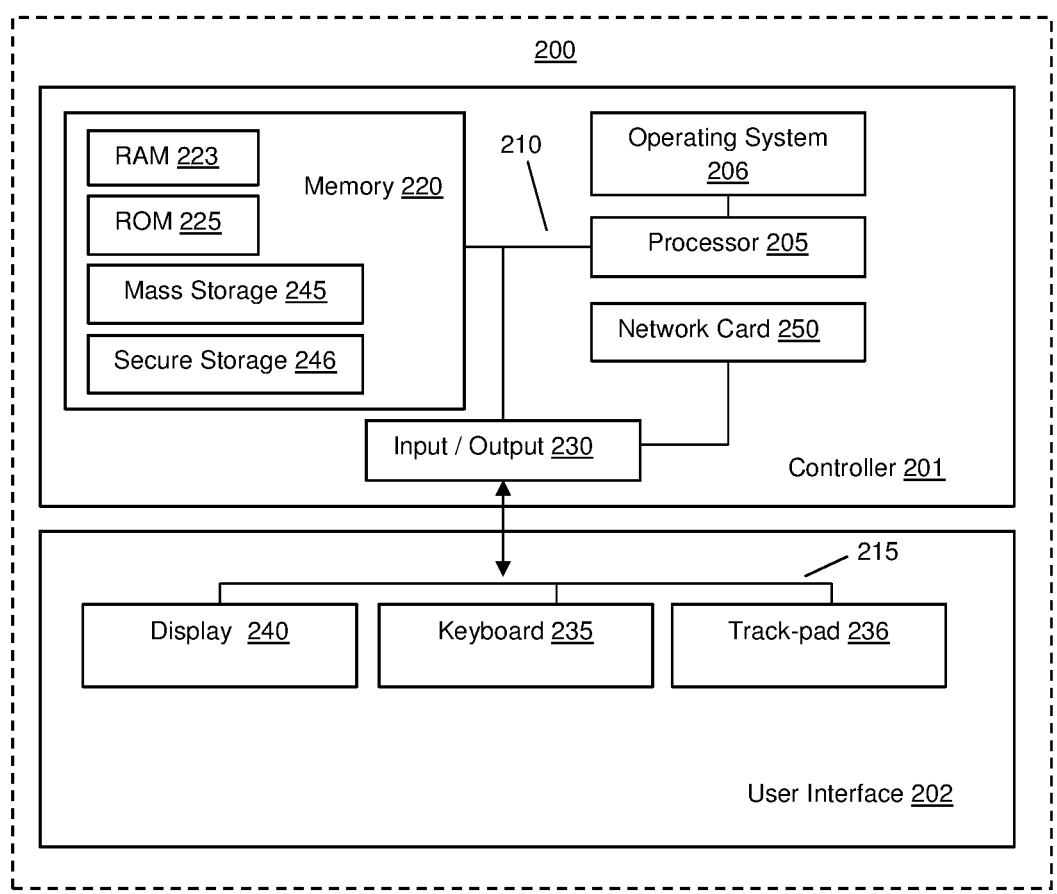
FIG. 2 illustrating a block diagram representative of processing systems providing embodiments in accordance with some embodiments of the invention.

FIG. 2 illustrates a block diagram representative of components of processing system 200 that may be provided within detectors 130, analysis centers 110 and database 105 for implementing some embodiments in accordance with some of these embodiments of the invention. One skilled in the art will recognize that the exact configuration of each processing system provided within detectors 130, analysis centers 110 and database 105 may be different and the exact configuration of processing system 200 may vary and FIG. 2 is provided by way of example only.

In embodiments of the invention, module 200 comprises controller 201 and user interface 202. User interface 202 is arranged to enable manual interactions between a user and module 200 and for this purpose includes the input/output components required for the user to enter instructions to control module 200. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, processor 205 mounted on a circuit board that processes instructions and data for performing the method of some embodiments, an operating system 206, an input/output (I/O) interface 230 for communicating with user interface 202 and a communications interface, in some of these embodiments in the form of a network card 250. Network card 250 may, for example, be utilized to send data from electronic device 200 via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). Memory 220 also includes secure storage 246 for securely storing secret keys, or private keys. It should be noted that the contents within secure storage 246 are only accessible by a super-user or administrator of module 200 and may not be accessed by any user of module 200.

One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 205 may be provided by any suitable logic circuitry for receiving inputs, processing them in accordance with instructions stored in memory and generating outputs (for example to the memory components or on display 240). In this embodiment, processor 205 may be a single core or multi-core processor with memory addressable space. In one example, processor 205 may be multi-core, comprising—for example—an 8 core CPU.

Figure 3:
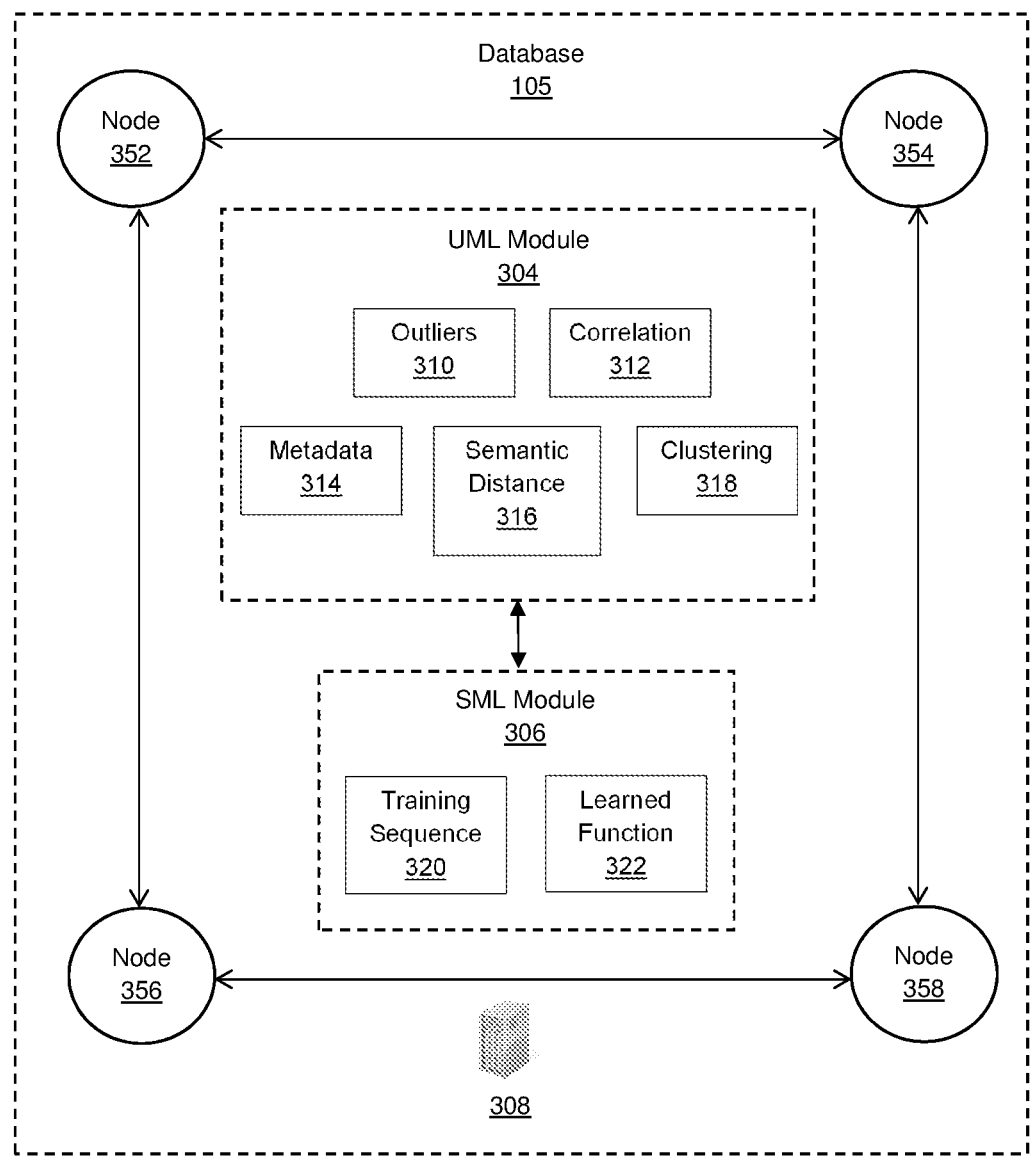
FIG. 3 illustrating a schematic block diagram of modules provided within a database in accordance with some embodiments of the invention.
Figure 4:
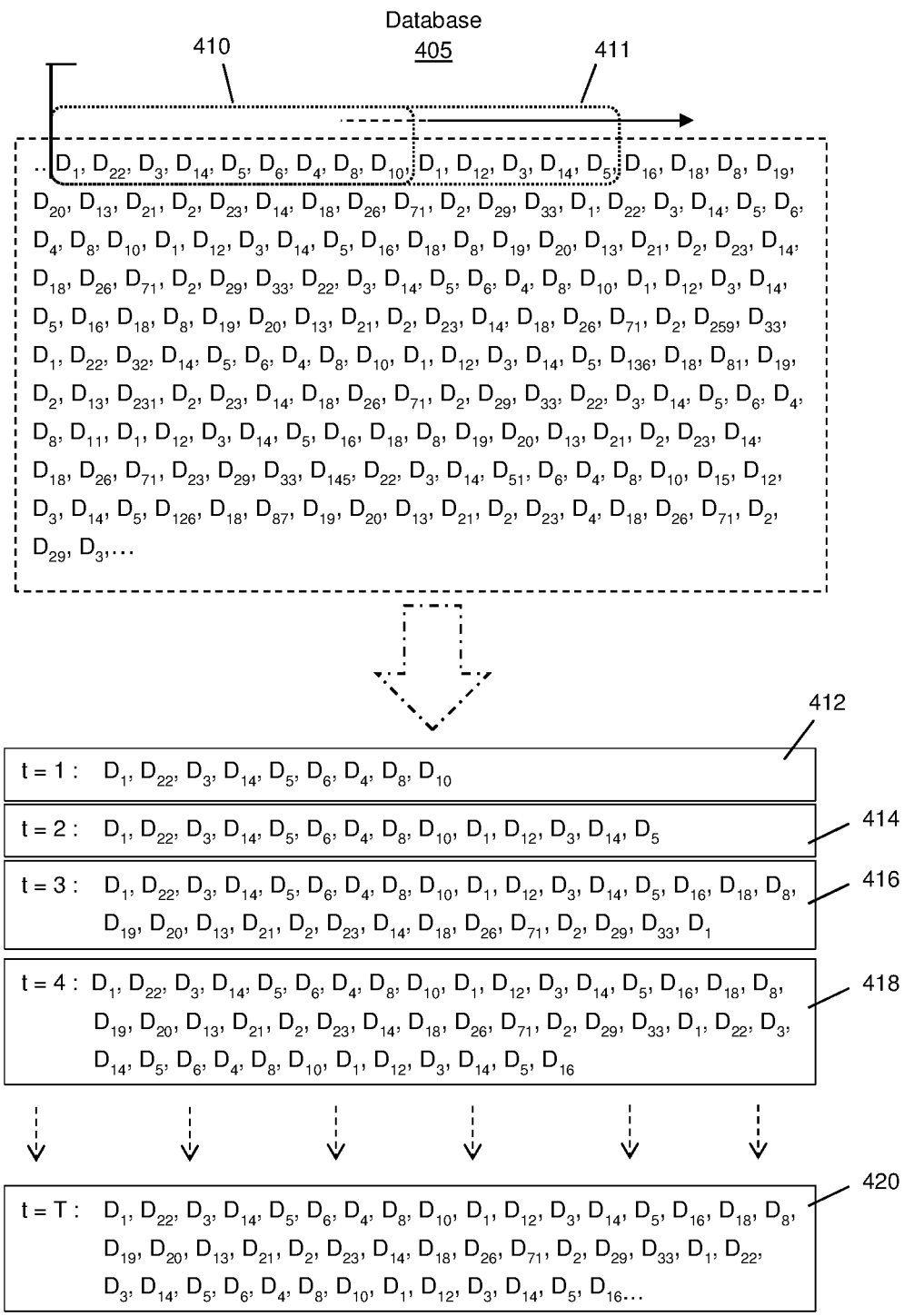
FIG. 4 illustrating a sample of data that have been gathered into groups according to their time components in accordance with some embodiments of the invention.

FIG. 3 illustrates a schematic block diagram of modules provided within database 105 in accordance with many embodiments of the invention. In particular, database 105 includes unsupervised machine learning (UML) module 304, supervised machine learning (SML) module 306, nodes 352, 354, 356, and 358, and secure database 308. As mentioned above, database 105 continually amasses a large database of TIF data as database 105 uninterruptedly receives security events of various sizes and formats from the centralized data analysis centers 110. The TIF data received by database 105 are all stored within secure database 308 and the contents of this database may be accessed by modules 304, 306 and/or any one of nodes 352, 354, 356, or 358.

In general, UML module 304 is configured to discover relationships between the TIF data stored in database 308 through unsupervised machine learning techniques. It is useful to recap at this stage that the TIF data comprise data translated from unstructured data having differing sizes and format types. As such, the attributes contained within each TIF data differs from the next. For example, in a first TIF data, the SOURCE, CATEGORY, DATA and TIME COMPONENT attributes may be populated while in a second TIF data, only the SOURCE and TIME COMPONENT attributes may be populated while the remaining attributes are left blank. It should be noted that one attribute that is always populated is the TIME COMPONENT attribute as this attribute sets out the time the security event was detected by detectors 130 (see FIG. 1).

In order to discover organized relationships between the TIF data stored in database 308, UML module 304 will utilize various cross products, joins or such functions to assemble organized data sets using the attributes of the TIF data and the TIF data themselves. The process of assembling an organized data set may also include the steps of defining relationships (e.g., connections, distances, and/or confidences) between the various attributes in the TIF data using multiple types of unsupervised machine learning algorithms. Once the organized data sets have been assembled, the organized data sets produced by UML module 304 may be displayed as probabilities, connections, distances, instances, or the like. Alternatively, the organized data sets may be used to populate a probabilistic graph database, a metadata layer for a probabilistic graph database, or as the input for any other such graphical products.

Contained within UML module 304 are outlier module 310, correlation module 312, metadata module 314, semantic distance module and clustering module 318. UML module 304 is configured to use some or all of these modules when UML module 304 is carrying out unsupervised machine learning processes.

When the unstructured and unlabelled data are translated into TIF data and when the TIF data are then stored in database 308, there is the possibility that spelling and typographical errors may occur. Correlation module 312 attempts to mitigate these translation errors caused by the TIF translation processes of database 105 or by the various labelling conventions utilized by the countless upstream sources, by identifying text that may be a derivation, misspelling, a short form, conjugation, or a variant of other similar words. The text identified by this module may be then be used by modules 314, 316, and 318 when these modules organize selected TIF data into organized groups.

Clustering module 318 may be configured to perform one or more clustering analysis on the TIF data as selected from database 308. Clustering module 318 achieves this by grouping a set of objects in such a way that objects in the same group (cluster) are more similar, in at least one sense, to each other than to those in other clusters. Non-limiting examples of clustering algorithms include hierarchical clustering, k-means algorithm, kernel-based clustering algorithms, density-based clustering algorithms, spectral clustering algorithms.

In certain embodiments, clustering module 318 ascertains one or more key attributes from the selected TIF data to form clusters around. These key attributes may be based on a frequency of occurrence of the attribute or a weightage applied to the attribute. In other embodiments of the invention, the clustering module may alternatively form a cluster around a column, row, or other features of the attributes that have a high degree of uniqueness.

Clustering module 318 may also utilize the obtained clusters or focal points to determine relationships between, distances between, and/or confidences for certain selected TIF data. The obtained statistical data my then be used to identify any similarities across a column/row family of selected TIF data. For example, maximum and minimum values in a column/row, the average column length, and the number of distinct values in a column of attributes may be obtained and the result may be used to assist UML module 304 to identify the likelihood that two or more columns/row are related, and hence which TIF data may be grouped together.

By using these clustering techniques to divide large amounts of TIF data into smaller organized group sets, this allows UML module 304 to determine relationships, distances, and/or confidences for the TIF data in database 308. In an embodiment of the invention, UML module 304 may make use of clustering module 318 to put together the organized data sets for certain TIF data or alternatively, UML module 304 may utilize other UML techniques to assemble the organized data sets without using clustering module 318.

As for metadata module 314, this module is configured to mine through any additional metadata that is not associated with any of the attributes of the selected TIF data. The main objective of module 314 is to identify any possible relationships that may be formed between the un-associated metadata and content described by the metadata. For example, module 314 may ascertain that a certain configuration or arrangement exists between the metadata and then proceeds to illustrate the relationships between the metadata.

As for semantic distance module 316, this module is configured to identify the meaning in language and words contained within the attributes of selected TIF data. The identified meanings of the attributes may then be used by module 316 to identify relationships between the selected TIF data.

Once UML module 304 has assembled the organized data sets by clustering the data contained within, the clustered data sets are then displayed by UML module 304 as probabilities, connections, distances, instances, or the like on graphs, plots or any other similar graphical representation. In short, an objective of UML module 304 is to attempt to identify some form of organization from selected unstructured or semi-structured TIF data by employing the UML techniques of modules 314, 316, and/or 318. UML module 304 will then display the outcome in an easily comprehensible manner whereby TIF data that are not sufficiently clustered or are not contained within these organized data sets will then be identified by UML module 304 as isolated data points.

The identification of these isolated data points may be carried out by outlier classification module 310. Outlier classification module 310 achieves this by identifying TIF data that is isolated from the formed clusters. In some embodiments of the invention, a data point is considered to be isolated if it is plotted at a certain distance away from any other plotted clusters whereby a cluster is identified as a group of six or more data points that are plotted nearby to each other. Each cluster typically comprises a number of data points that exceeds a predetermined minimum number, e.g. >5 data points. One skilled in the art will recognize that the predetermined minimum number may vary from one embodiment to the next without departing from the invention. These identified data points are then classified as isolated data points and these isolated data points will then be further analysed to determine which data points may be categorized as data outliers or measurement errors.

In many embodiments of the invention, isolated data points may be categorized as data outliers if a significant number of these isolated data points (i.e. a total number of isolated data points exceeds a minimum threshold value) are plotted within a particular distance from each other. For example, if two isolated data points are plotted nearby to each other, i.e. distance<d, whereby "d" is a predetermined distance and the significant number of isolated data points represents any number more than one, these two isolated points may then be considered as data outliers. If an isolated data point is not within range or within a particular distance "d" from any other isolated data point, then such an isolated data point is considered as a measurement error and possibly may be disregarded. Data points classified as data outliers are then provided to SML module 306 for further processing.

As for SML module 306, the general function of this module is to receive the data outliers detected by UML module 304 and to further process them to produce learned functions. SML module 306 achieves this by providing the received data outliers from UML module 304 to training sequence module 320. Training sequence module 320 then gathers all the received data outliers and proceeds to utilize the gathered data as a training set for supervised machine learning algorithms. Among the many SML algorithms contained within SML module 306 that may be trained by the training set includes, but are not limited to, decision trees, ensembles (Bagging, Boosting, Random forest), k-NN, linear regression, Naive Bayes, Neural networks, logistic regression, perceptron, and etc.

Training sequence module 320 will then utilize the training sets to train the SML algorithms. Once the SML algorithms have been trained, these trained SML algorithms are then provided to learned function module 322 whereby they are then classified as learned functions or learning assertion functions. These learned functions may then be distributed to select centralized data analysis centers 110 to tune and improve the security postures of these centers by strengthening the machine learning algorithms and techniques utilized in these centers.

The functions of the various modules in database 105 are best described in the example below with reference to FIGS. 4-7.

In operation, a significant amount of TIF data would be amassed within database 308 (in database 105) in near-real-time as fragmented, unstructured, and unlabelled security events and/or as learned functions as received from a multitude of cyber-security surveillance systems and/or detectors are transmitted to database 105 and are translated by database 105 into a uniformed meta-format such as TIF. After a certain amount of TIF data have been amassed, one of nodes 352, 354, 356 or 358 may then be configured to carry out UML techniques on TIF data that have time components contained within a particular time period.

For example, node 352 may be utilized to gather and carry out UML techniques on TIF data having a "Time Component" attribute that occurred within a first time period, i.e. between $0 \leq t \leq 1$. This means that node 352 will first select all TIF data that have a time component, t that occurred between $0 \leq t \leq 1$. All the selected TIF data will then be placed into group 412. It should be noted that the types of TIF data contained within this group need not be from a similar source nor should it be from the same type. In some embodiments of the invention, in order to select all the TIF data occurring within the first time period, database 105 may generate a variable time window 410 that will encompass all the TIF data falling within the first time period. In this illustration, it can be seen that the following TIF files $\{D_1, D_{22}, D_3, D_{14}, D_5, D_6, D_4, D_8, D_{10}\}$ are encompassed within window 410.

Simultaneously, node 354 may be utilized to gather and carry out UML techniques on TIF data having a "Time Component" attribute that occurred within a second time period whereby the second time period comprises a period of time that is longer than the first time period, i.e. between $0 \leq t \leq 2$. This means that node 354 will first select all TIF data that have a time component, t that occurred between $0 \leq t \leq 2$. All the selected TIF data will then be placed into group 414. Similarly, in order to select all the TIF data occurring within the first time period, database 105 may extend variable time window 410 thereby producing variable time window 411 to encompass all the TIF data falling within the second time period. In this illustration, it can be seen that the following TIF files $\{D_1, D_{22}, D_3, D_{14}, D_5, D_6, D_4, D_8, D_{10}, D_1, D_{12}, D_3, D_{14}, D_5\}$ are encompassed within window 411.

At the same time, nodes 356 and 358 may be utilized to gather and carry out UML techniques on TIF data having a "Time Component" attribute that occurred within a third and fourth time periods respectively, i.e. between $0 \leq t \leq 3$; and between $0 \leq t \leq 4$ respectively. This means that nodes 356 and 358 will first select all TIF data that have a time component, "t" that occurred between $0 \leq t \leq 3$ and between $0 \leq t \leq 4$ respectively by extending the variable time window as required (not shown). All the selected TIF data will then be placed into groups 416 and 418 respectively. One skilled in the art will recognize that database 105 is not limited to having only four nodes (i.e. nodes 352, 354, 356, 358) and may be configured to have any number of nodes as required. Further, it should be noted that window 410 may be controlled (i.e. widened) by any one of these nodes to encompass any amount and size of data as required. If database 105 is provided with a "T" number of nodes, this means that up to T variable windows and T groups representing a total of T time periods may exist at any one time.

Although this example only describes the usage of nodes 352 and 354, one skilled in the art will recognize that any number of nodes may be utilized simultaneously to gather and carry out UML techniques on TIF data for different time periods.

Returning to the example above, once node 352 has formed group 412 using TIF data having a time component attribute that falls within the first time period; the content of group 412 is then provided to UML module 304. UML module 304 then attempts to identify some form of organization from the unstructured or semi-structured TIF data contained in group 412 by employing the UML techniques of modules 314, 316, and/or 318. An exemplary output from UML module 304 after the content of group 412 has been processed using the UML techniques are illustrated in FIG. 5.

Figure 5A:
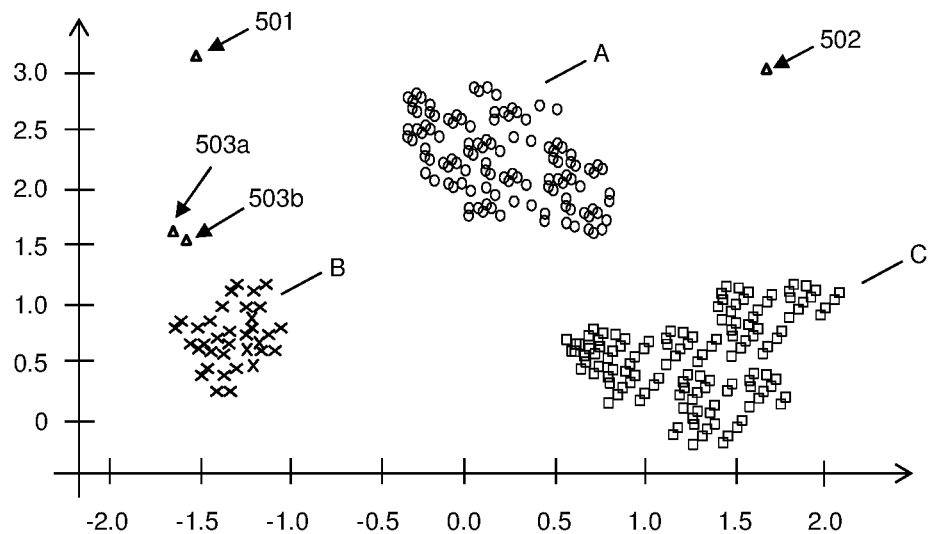
FIG. 5a illustrating a plot showing data that has been clustered using unsupervised machine learning techniques for data falling within a first time period in accordance with some embodiments of the invention.

As illustrated in FIG. 5a, it can be seen that three clusters, i.e. clusters A, B and C, have been formed from the content of group 412. Outlier classification module 310 will then proceed to identify and mark plotted points on the graph that are isolated from the three formed clusters.

In some embodiments of the invention, a point is considered to be isolated from a cluster if the point is not part of a group of points or if a group of points has a number of points that are less than a perquisite number of points to be considered as a cluster. In this example, a group of points is only considered as a cluster if the group has at least six or more data points in the group.

Module 310 then identifies and marks the isolated points as potential data outliers or isolated data points for this first time period. In FIG. 5a; these points are identified and marked as points 501, 502, 503a and 503b. It should be noted than although points 503a and 503b comprises of more than one data point, these data points are still marked as isolated data points and not clusters as these data points are considered to be isolated from the clusters. In other words, as data points 503a and 503b have a number of data points, i.e. two data points, that are less than a prerequisite number of data points to be considered as a cluster, points 503a and 503b are also marked as potential data outliers or isolated data points. The prerequisite number of data points for a cluster depends on the configuration of database 105 whereby if database 105 is provided with a powerful server or processor, this prerequisite number may comprise larger values, i.e. <20 else, this number would comprise smaller values, i.e. <5.

Outlier classification module 310 may then be utilized to classify the isolated data points. To recap, if a significant number of these isolated data points (i.e. a total number of isolated data points exceeds a minimum threshold value) are plotted within a particular distance from each other, these isolated points may then be considered as data outliers.

In a particular embodiment of the invention, the minimum threshold value is set as "one" or the minimum number of data points has to be two or more, and the predetermined distance is set as "k".

Figure 5B:
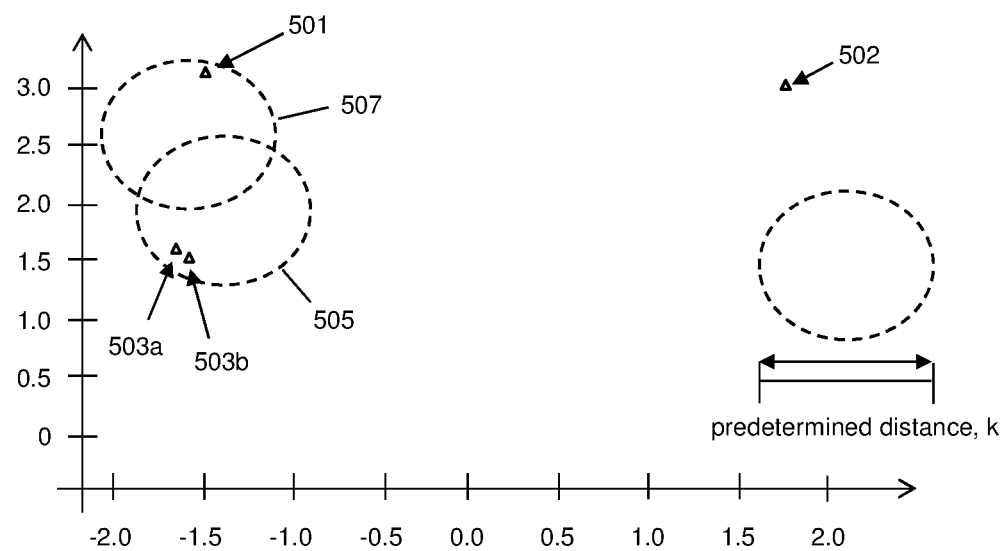
FIG. 5b illustrating a plot showing isolated data points as obtained from the first time period.

Hence, based on the settings above, module 310 will only classify two or more isolated data points as data outliers if these two or more isolated data points are plotted sufficiently near to each other that is, if the distances between two or more isolated data points are less than a pre-determined distance value. This is illustrated in FIG. 5b whereby it can be seen that the distance between data points 503a and 503b is less than the predetermined distance, k (i.e. more than one data point is contained within circle 505 having a diameter k) while the distances between data point 501 and points 503a, 503b and 502 exceeds the predetermined distance, k (i.e. not more than one data point is contained within circle 507 having a diameter k). Hence, points 503a and 503b are then classified as data outliers while points 501 and 502 are disregarded.

In some other embodiments of the invention, if outlier classification module 310 wishes to classify more isolated data points as data outliers, the pre-determined distance value, k, may be increased accordingly so that the distances between two or more isolated data points may be considered to be less than the pre-determined distance value. Similarly, the value of the "minimum threshold value" may be reduced to classify more isolated data points as data outliers.

Simultaneously, while the above processes are taking place, once node 354 has formed group 414 using TIF data having a time component attribute that falls within the second time period; the content of group 414 may then be provided to UML module 304. UML module 304 then attempts to identify some form of organization from the unstructured or semi-structured TIF data contained in group 414 by employing a similar UML technique as that used to process the contents in group 412.

Figure 6:
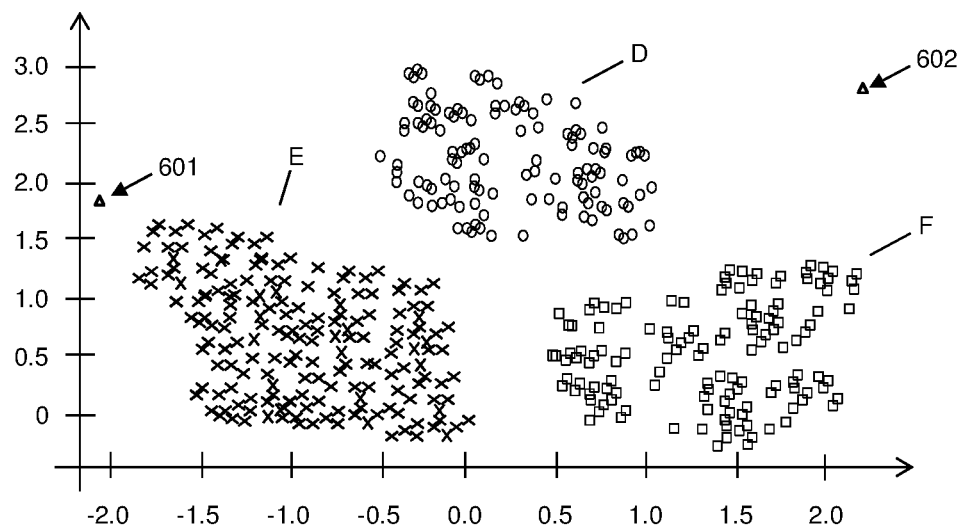
FIG. 6 illustrating a plot showing data that has been clustered using unsupervised machine learning techniques for data falling within a second time period whereby the second time period is longer than the first time period in FIG. 5 in accordance with some embodiments of the invention.

After the content of group 414 has been processed using the UML techniques in UML module 304, the output is then plotted. As illustrated in FIG. 6, it can be seen that the three clusters, i.e. clusters D, E, F, formed from the content of group 414 almost resembles the three clusters, i.e. clusters A, B, C, formed from the content of group 412. This can be seen by comparing the plots in FIG. 5a with the plots in FIG. 6. However, it can be seen that points 503a and 503b have been assimilated into one of the three clusters in FIG. 6, i.e. into cluster E.

Outlier classification module 310 will then proceed to identify and mark points that are isolated in this graph. Similarly, a data point is considered to be isolated from a cluster if the data point is not part of a group of data points or if a group of data points has a number of data points that are less than a perquisite number of data points to be considered as a cluster. As illustrated in the graph in FIG. 6, points 601 and 602 appear to be isolated from the three formed clusters D, E, F. Hence, module 310 will then mark data points 601 and 602 as potential data outlier points or isolated data points in relation to the second time period.

As outlier classification module 310 now has two sets of isolated data points to process, i.e. points 501, 502, 503a, 503b as generated from group 412 and points 601 and 602 as generated from group 414, outlier classification module 310 will then repeat the classification process for these two groups of data points. Isolated data points from groups 412 and 414 are plotted in FIG. 7.

To recap, in particular embodiment of the invention, the minimum threshold value is set as "one" or the minimum number of data points has to be two or more, and the predetermined distance is set as "k".

Figure 7:
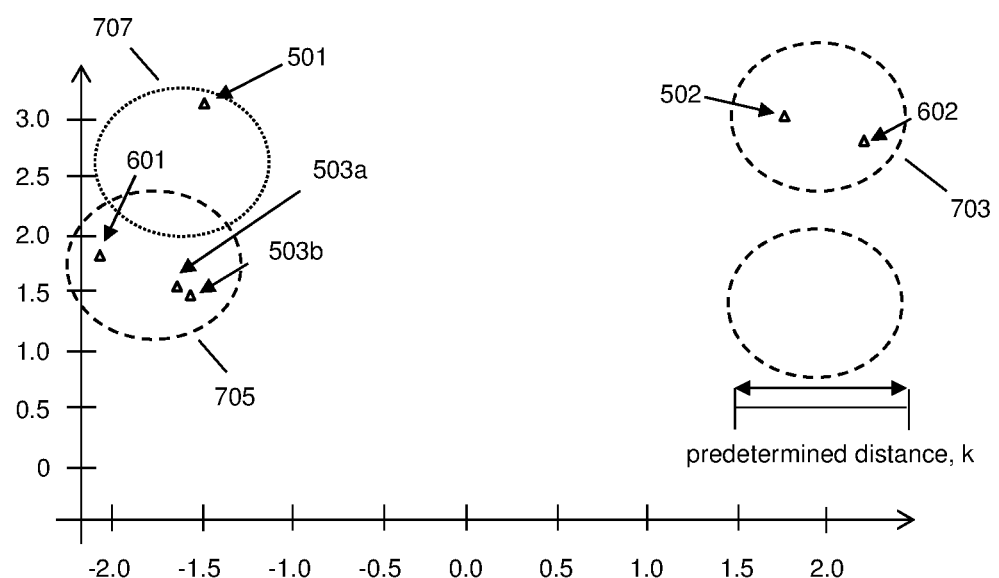
FIG. 7 illustrating a plot showing isolated data points as obtained from the first and second time period.

Outlier classification module 310 then begins by identifying isolated data points that are plotted sufficiently near to each other. For example, outlier classification module 310 will begin the classification process by selecting a first point, e.g. point 601. Outlier classification module 310 will then measure the distance from this point to a nearby point, e.g. points 503a or 503b. If the distance measured between point 601 and point 503a is less than a pre-determined distance value, these two points are then classified as data outliers. Conversely, if the distance measured between point 601 and point 503a is more than a pre-determined distance value, the relationship between these two points may then be disregarded. Outlier classification module 310 then repeats this process for all the points plotted in FIG. 7 until distances between the selected point and all the points have been measured and the measured distances have been compared against the pre-determined distance value. Points that are not classified as data outliers are then marked as measurement errors and removed from the plot As illustrated in FIG. 7, it can be seen that the distances between data points 503a, 503b and 601 are less than the predetermined distance, k (i.e. these two and more data points are contained within circle 705 having a diameter k) while the distances between data point 501 and all the other data points exceeds the predetermined distance, k (i.e. no two or more data points may be contained within circle 501 having a diameter k). Hence, points 601, 503a and 503b may be classified as data outliers while point 501 is disregarded. Similarly, as the distance between data points 502 and 602 is less than the predetermined distance, k (i.e. these two data points are contained within circle 703) these two data points may also be classified as data outliers.

In some other embodiments of the invention, outlier classification module 310 may also utilize a k-nearest-neighbour (k-NN) algorithm to carry out classification of the data points as data outliers without departing from this invention.

Training sequence module 320 will then utilize these data outliers as training sets to train SML algorithms. Once the SML algorithms have been trained, these trained SML algorithms are then provided to learned function module 322 whereby they are then classified as learned functions or learning assertion functions. These learned functions may then be used to empower or strengthen the security postures of the various centralized data analysis centers 110.

It should be noted that if the clustering and classification processes performed by clustering module 318 and outlier classification module 310 were to be carried out only for TIF data contained within a single time frame, i.e. the first time period, these modules would have only identified data points 503a and 503b as data outliers. Similarly, if these modules were to carry out the clustering process only for TIF data contained within the second time period, these modules would not have identified any data points as data outliers.

Only by combining isolated data points from these two time periods was clustering module 318 and outlier classification module 310 able to accurately identify that the data outliers comprises of data points 601, 503a, 503b, 502 and 602. Hence, data outliers may only be accurately determined if unsupervised machine learning techniques described above are applied to each group of translated data, whereby each group represents a different time frame.

In accordance with many embodiments of the invention, a method for quantitative unified analysis of unstructured threat intelligence data comprises the following five steps:

Step 1, receiving unstructured threat intelligence data from a plurality of upstream sources;

Step 2, uniting the received unstructured threat intelligence data by translating each received threat intelligence data into a uniformed meta-format and storing the translated data in a database, wherein each translated data includes at least a time component;

Step 3, determining isolated data points from the translated data stored in the database by grouping the translated data into groups, wherein each group represents a unique time period, and applying unsupervised machine learning techniques to each group of the translated data;

Step 4, determining data outliers from the isolated data points; and

Step 5, generating a learned function for at least one of the plurality of upstream sources using the data outliers.

In a number of embodiments of the invention, a process is needed for quantitatively unifying and analysing unstructured threat intelligence data from a plurality of upstream sources. The following description and FIGS. 8 and 9 describe various embodiments of processes that provide processes in accordance with this invention.

Figure 8:
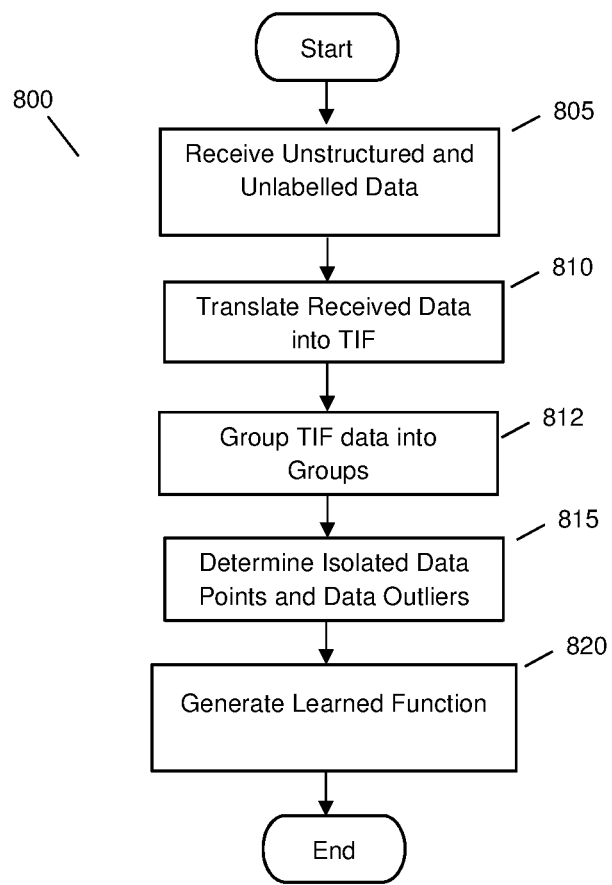
FIG. 8 illustrating a flow diagram of a process for quantitatively unifying unstructured threat intelligence data in accordance with some embodiments of the invention.

FIG. 8 illustrates process 800 that is performed by a computer system to quantitatively unify and analyse unstructured threat intelligence data from a plurality of upstream sources in accordance with a number of embodiments of this invention. Process 800 begins at step 805 by receiving unstructured and unlabelled threat intelligence data from a plurality of upstream sources. Process 800 then unifies the received data by translating the received data into transportable incident format (TIF) records and stores the TIF data into a database. This takes place at step 810. It should be noted that each TIF data includes at least a time component attribute. At step 812, process 800 groups the TIF data into groups whereby each group represents a unique time period. For example, there may be five groups formed from the translated TIF data whereby the first group represents a first time period, the second group represents a third time period, the third group represents a third time period, the fourth group represents a fourth time period, and the fifth group represents a fifth time period. The fifth time period then represents a longer time period than the fourth time period, the fourth time period represents a longer time period than the third time period and so on, with the first time period being the shortest time period.

Process 800 then proceeds to apply unsupervised machine learning techniques to the TIF data contained within the various groups or time periods and this takes place at step 815. During this step, process 800 then determines isolated data points and from these isolated points, determines data outliers for various time frames or time periods of TIF data. Process 800 then generates learned functions at step 820 using the obtained data outliers whereby the learned functions are then provided to at least one of the plurality of upstream sources to improve a security posture of the upstream source. Process 800 then ends.

Figure 9:
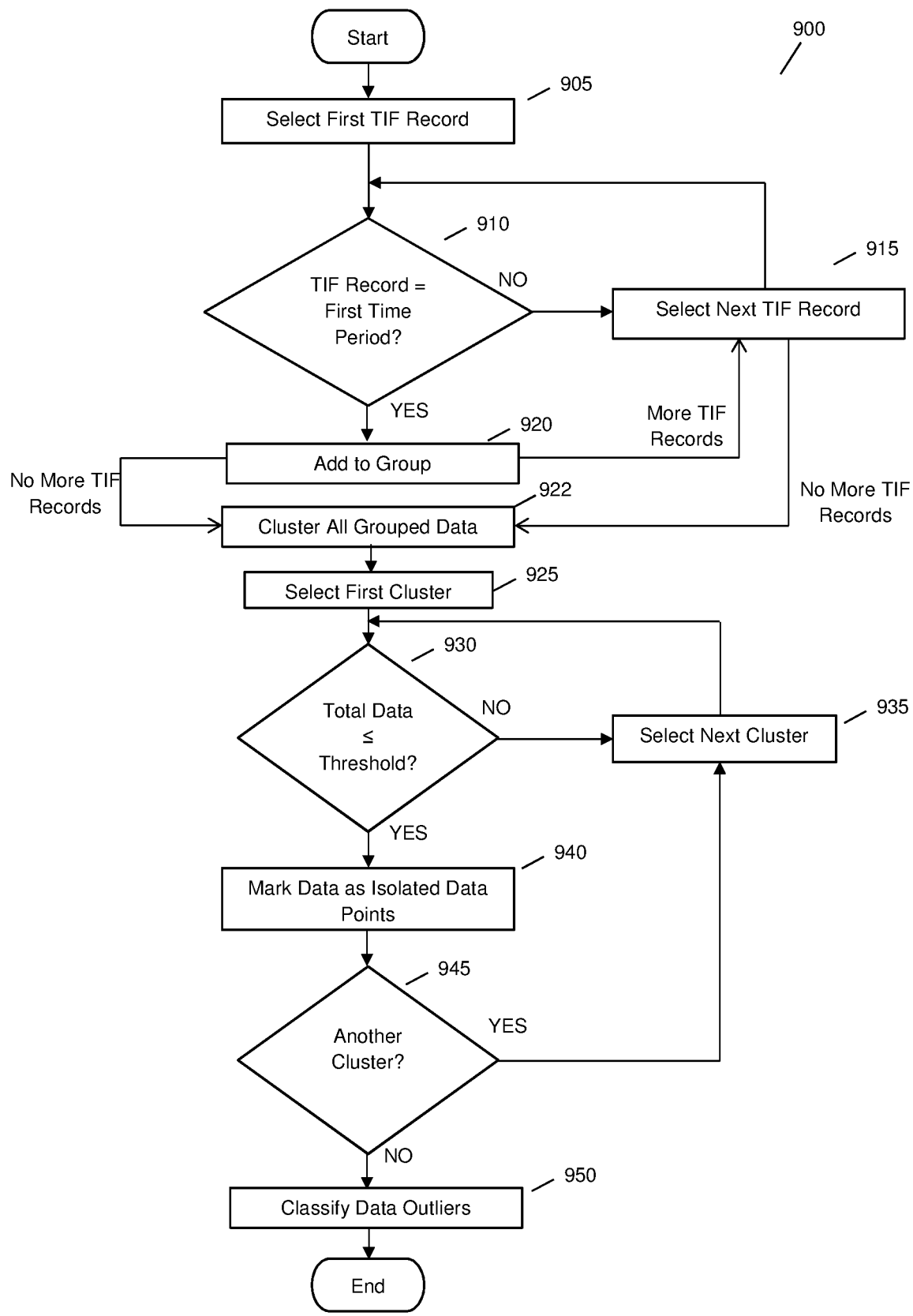
FIG. 9 illustrating a flow diagram of a process for determining data outliers from clustered data in accordance with some embodiments of the invention.

FIG. 9 illustrates process 900 that is performed by a computer system to determine data outliers from TIF data that have a time component falling within a first time period. Process 900 begins at step 905 whereby process 900 selects a first TIF data from the database. At step 910, process 900 then proceeds to determine whether the selected TIF data has a time component which falls within a first time period. If process 900 determines that the selected TIF data does not have a time component that falls within the first time period, process 900 proceeds to step 915 whereby process 900 selects a next TIF data from the database. Process 900 then proceeds back to step 910 whereby the selected TIF data is processed by process 900 at step 910. Conversely, if at step 910 process 900 determines that the selected TIF data has a time component which falls within the first time period, process 900 will proceed to step 920.

At step 920, the selected TIF data will be added to a group. Process 900 then determines whether there are more TIF data that have yet to be processed by process 900. If there are more TIF data, process 900 proceeds to step 915. At this step, the next TIF data is selected and process 900 proceeds to step 910.

Returning to step 910, in the situation whereby process 900 determines that the selected TIF data does not have a time component that falls within the first time period, process 900 proceeds to step 915 and if at step 915 process 900 is unable to select another TIF data because all TIF data have been processed by process 900, process 900 then proceeds to step 922 instead.

Returning to step 920, after the selected TIF data has been added to a group and if process 900 determines that there are no more TIF data left to be processed by process 900, process 900 then proceeds to step 922.

At step 922, process 900 will cluster all the data in the group using unsupervised machine learning algorithms. Process 900 then proceeds to step 925 whereby at this step, process 900 will select a first cluster from the clusters that were generated at step 922. At this step, process 900 then determines if the total number of data points in the selected cluster exceeds a threshold. If process 900 determines that the number of data points exceeds the threshold, process 900 then proceeds to step 935. At step 935, process 900 will select the next cluster and then proceeds to step 930.

Conversely, if process 900 determines at step 930 that the total number of data points in the selected cluster is less or equal than a threshold, process 900 will proceed to step 940. At this step, process 900 will classify the data in this selected cluster as isolated data points. Process 900 then proceeds to step 945.

At step 945, process 900 determines if there are any other clusters that have yet to be processed by process 900 at step 930. If there is another cluster, process 900 proceeds to select the other cluster at step 935 and repeats steps 930 to 945. Alternatively, if all the clusters have been selected and processed, process 900 then proceeds to step 950. At step 950, all the possible outliers are then plotted onto a graph.

Process 900 then measures the distance between all the plotted isolated data points to identify a significant number of isolated data points that have a minimum distance between them. These points that meet the minimum distance requirement are then classified by process 900 as data outliers. Points that are not classified as data outliers are then marked by process 900 as measurement errors and removed from the plot. The data outliers are then used as the training sets for supervised machine learning algorithms in accordance with many embodiments of the invention. Process 900 then ends.

The above is a description of various embodiments of a system and process in accordance with the present invention as set forth in the following claims. It is envisioned that others may and will design alternatives that fall within the scope of the following claims.

The invention claimed is:

1. A method for quantitative unified analysis of unstructured threat intelligence data, the method to be performed by a computer system comprising:
   receiving unstructured threat intelligence data from molecular level sources, wherein the unstructured threat intelligence data comprises security events generated from the molecular level sources; uniting the received unstructured threat intelligence data by translating the received threat intelligence data into a uniformed meta-format and storing the translated data in a database, wherein each translated data includes at least a time component;
   determining isolated data points from the translated data stored in the database by grouping the translated data into groups, wherein the determining comprises:
   determining a first group of translated data from the translated data where data in the first group has time components contained within a first time period into a first group,
   determining at least one cluster of data from the translated data in the first group using unsupervised machine learning techniques,
   identifying at least one sparse cluster from the at least one clusters having a total number of data points below a predefined threshold, and
   categorizing the data in each of the at least one sparse clusters, identified as having the total number of data points below the predefined threshold, as isolated data points; determining data outliers from the isolated data points;
   generating a learned function using the data outliers; and
   providing the generated learned function to at least one of a plurality of upstream sources to update a security rule of the at least one of the plurality of upstream sources using the provided generated learned function, wherein the updated security rule set is used to filter threats to the at least one of the plurality of upstream sources.

2. The method according to claim 1 wherein the unstructured threat intelligence data further comprises triggers generated from atomic level sources, wherein the security events generated from the molecular sources are based on the triggers generated from atomic level sources.

3. The method according to claim 1 wherein the determining the isolated data points from the translated data stored in the database comprises: grouping the translated data having time components contained within a first time period into a first group and grouping the translated data having time components contained within a second time period into a second group, wherein the second time period comprises a period of time that is longer than the first time period;
clustering the translated data in the first and second groups using unsupervised machine learning techniques;
plotting the clusters and identifying clusters having a total number of data points below a predefined threshold; and
categorizing the data in the identified clusters as isolated data points.

4. The method according to claim 1 wherein the step of determining data outliers from the isolated data points comprises: generating a fixed sized window; identifying isolated data points that may be concurrently located within the fixed sized window; and classifying the identified data points as data outliers.

5. The method according to claim 1 wherein the generating the learned function comprises:
generating training sequences using the data outliers; and
training supervised machine learning algorithms using the generated training sequences, wherein the learned function comprises at least one trained supervised machine learning algorithm.

6. The method according to any of claim 1 wherein the unsupervised machine learning techniques comprises mining metadata from the normalized data.

7. The method according to any one of claim 1 wherein the unsupervised machine learning techniques comprises identifying relationships in data of the normalised data by identifying semantic distances between the normalised data.

8. The method according to any one of claim 1 wherein the unsupervised machine learning techniques comprises using statistical data to determine a relationship between the normalised data.

9. A computer system for quantitative unified analysis of unstructured threat intelligence data, the method to be performed by a computer system comprising:
circuitry configured to receive unstructured threat intelligence data from molecular level sources, wherein the unstructured threat intelligence data comprises security events generated from the molecular level sources;
circuitry configured to unite the received unstructured threat intelligence data by translating the received threat intelligence data into a uniformed meta-format and storing the translated data in a database, wherein each translated data includes at least a time component;
circuitry configured to determine isolated data points from the translated data stored in the database by grouping the translated data into groups, the circuitry configured to determine comprises:
circuitry configured to determine a first group of translated data from the translated data where data in the first group has time components contained within a first time period into a first group,
circuitry configured to determine at least one cluster of data from the translated data in the first group using unsupervised machine learning techniques,
circuitry configured to identify at least one sparse cluster from the at least one clusters having a total number of data points below a predefined threshold, and
circuitry configured to categorize the data in each of the at least one sparse clusters, identified as having the total number of datapoints below the predefined threshold, as isolated data points;
circuitry configured to determine data outliers from the isolated data points;
circuitry configured to generate a learned function using the data outliers; and
circuitry configured to providing the generated learned function to at least one of a plurality of upstream sources to update a security rule of the at least one of the plurality of upstream sources using the provided generated learned function, wherein the updated security rule set is used to filter threats to the at least one of the plurality of upstream sources.

10. The computer system according to claim 9 wherein the unstructured threat intelligence data further comprises triggers generated from atomic level sources, wherein the security events generated from the molecular sources are based on the triggers generated from atomic level sources.

11. The computer system according to any one of claim 9 wherein the circuitry configured to determine the isolated data points from the translated data stored in the database comprises:
circuitry configured to group the translated data having time components contained within a first time period into a first group and to group the translated data having time components contained within a second time period into a second group, wherein the second time period comprises a period of time that is longer than the first time period;
circuitry configured to cluster the translated data in the first and second groups using unsupervised machine learning techniques;
circuitry configured to plot the clusters and identify clusters having a total number of data points below a predefined threshold; and
circuitry configured to categorize the data in the identified clusters as isolated data points.

12. The computer system according to claim 9 wherein the circuitry configured to determine data outliers from the isolated data points comprises: circuitry configured to generate a fixed sized window; circuitry configured to identify isolated data points that may be concurrently located within the fixed sized window; and circuitry configured to classify the identified data points as data outliers.

13. The computer system according to claim 9 wherein the circuitry configured to generate the learned function comprises:
circuitry configured to generate training sequences using the data outliers; and circuitry configured to train supervised machine learning algorithms using the generated training sequences, wherein the learned function comprises at least one trained supervised machine learning algorithm.

14. The computer system according to claim 9 wherein the unsupervised machine learning techniques comprises mining metadata from the normalised data.

15. The computer system according to claim 9 wherein the unsupervised machine learning techniques comprises identifying relationships in data of the normalised data by identifying semantic distances between the normalised data.

16. The computer system according to claim 9 wherein the unsupervised machine learning techniques comprises using statistical data to determine a relationship between the normalised data.

* * * * *